United States Patent
Jayawardena et al.

(10) Patent No.: US 10,425,419 B2
(45) Date of Patent: Sep. 24, 2019

(54) SYSTEMS AND METHODS FOR PROVIDING SOFTWARE DEFINED NETWORK BASED DYNAMIC ACCESS CONTROL IN A CLOUD

(71) Applicant: AT&T Intellectual Property I, L.P., Atlanta, GA (US)

(72) Inventors: Thusitha Jayawardena, Holmdel, NJ (US); John Liefert, Matawan, NJ (US); Christopher Van Wart, Ocean, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 387 days.

(21) Appl. No.: 15/215,860

(22) Filed: Jul. 21, 2016

(65) Prior Publication Data

US 2018/0026987 A1    Jan. 25, 2018

(51) Int. Cl.
*H04L 29/06* (2006.01)

(52) U.S. Cl.
CPC ........ *H04L 63/102* (2013.01); *H04L 63/0227* (2013.01); *H04L 63/083* (2013.01); *H04L 63/0823* (2013.01); *H04L 63/0892* (2013.01); *H04L 2463/082* (2013.01)

(58) Field of Classification Search
CPC ............................... H04L 63/20; H04L 45/38
See application file for complete search history.

(56) References Cited

U.S. PATENT DOCUMENTS

| | | | |
|---|---|---|---|
| 9,253,019 B1 | 2/2016 | Romanov et al. | |
| 9,264,301 B1 * | 2/2016 | Chua | H04L 45/02 |
| 2013/0031271 A1 | 1/2013 | Bosch et al. | |
| 2014/0089506 A1 * | 3/2014 | Puttaswamy Naga | H04L 45/42 709/225 |
| 2015/0207699 A1 | 7/2015 | Fargano et al. | |
| 2015/0295849 A1 | 10/2015 | Xia et al. | |
| 2015/0304281 A1 * | 10/2015 | Kasturi | H04L 63/105 726/1 |
| 2015/0319081 A1 | 11/2015 | Kasturi et al. | |
| 2015/0363423 A1 * | 12/2015 | Utgikar | H04L 67/1095 707/827 |
| 2015/0365278 A1 | 12/2015 | Chakrabarti et al. | |
| 2015/0381623 A1 | 12/2015 | Mattson et al. | |
| 2016/0050140 A1 | 2/2016 | Chinni et al. | |
| 2016/0057052 A1 | 2/2016 | Zhang et al. | |
| 2016/0065501 A1 | 3/2016 | Watanabe et al. | |
| 2016/0080505 A1 | 3/2016 | Sahin et al. | |
| 2016/0142301 A1 | 5/2016 | Anand et al. | |

* cited by examiner

*Primary Examiner* — Jason K Gee
(74) *Attorney, Agent, or Firm* — BakerHostetler

(57) ABSTRACT

A system for providing access control in a cloud includes a software defined network including a software defined network controller. The system is configured to authenticate user access using multi-factor authentication. If the user is authorized to access a cloud resource the software defined network controller sends instructions to insert layer 3 and 4 user-specific flows to a software defined network device connected to the cloud resource. The user-specific flows cause the software defined network device to grant access to the cloud resource to the user.

12 Claims, 6 Drawing Sheets

SYSTEMS AND METHODS FOR PROVIDING SOFTWARE DEFINED NETWORK BASED DYNAMIC ACCESS CONTROL IN A CLOUD

TECHNICAL FIELD

The present disclosure relates to access control to a network. More particularly, the present disclosure relates to software defined network based dynamic access control in a cloud.

BACKGROUND

Cloud Computing has developed to a mature state and offers distinct cost saving opportunities by consolidating and restructuring information technology services. Cloud computing offers services which include storage, computing and networking. An important aspect of such distributed virtual systems is security. Security in cloud computing applications is difficult to implement because cloud computing is a dynamic environment where the resources are allocated on demand. Security issues raised by cloud computing include data protection, network security, virtualization security, application integrity, and identity management.

Access control is the mechanism that allows, denies or restricts user access to a system. It is the process of deciding who can use specific system resources and applications. Access control ensures that only authorized users can access the data, and it also monitors and records all attempts made to access a system. Access control provides security to the resources or data by controlling access to the resources and the system itself. Access control also manages users, files and other resources by controlling user's privileges to access files or resources or data. With access control various steps like authentication, authorization and accounting are performed when a user actually accesses the resources.

In current widely deployed solutions access control to resources is based on AAA (Authentication, Authorization, Accounting) infrastructure. Authentication occurs when a user is identified before accessing a resource. Authorization is the process of granting or denying a user some activity on a resource. The Accounting portion of the AAA security system is the logging and metering of actions when a user accesses a resource.

Cloud infrastructure has additional attack surfaces compared to non-cloud platforms. (For example, since multiple VMs can be running on a common hypervisor, there is a possibility for an attacker to access VMs other than those to which he/she has legitimate access. This may be achieved either by accessing other VMs directly or by compromising the common hypervisor. Also, when a user is authenticated on a VM on a compute node, the user may be provided with access to other cloud resources in the compute node. For example, in the case of a compute node having an admin VM, the admin VM must be connected to all critical resources of the project the admin user needs to manage. A hacker that accesses the admin VM will consequently have access to all such critical resources.

Consequently there is a need to provide a means of giving differential access to cloud resources based on user-credentials and to foreclose attack surfaces in a cloud infrastructure. Specifically there is a need to minimize attackers from having potential access to VMs other than those to which the user has legitimate access. Moreover there is a need to provide "just-in-time" connectivity in a cloud infrastructure to mitigate/minimize damage that can be caused by an attacker gaining access to admin resources in the cloud.

SUMMARY OF THE DISCLOSURE

A first aspect of the disclosure provides a method for controlling access to network resources comprising: receiving in a server a request from a user to access a cloud resource; receiving user authentication information in the server and comparing the user authentication information to a profile to determine if the user is authorized to access the resource. If the user is authorized to access the resource, sending to a software defined network controller, instructions to insert layer 3 and 4 user-specific flows to software defined network devices connected to the cloud resource wherein the user-specific flows cause the software defined network devices to grant the user access to the cloud resource.

A second aspect of the disclosure provides a system for controlling access to cloud resources comprising a server disposed in a software defined network. The system also includes at least one subsystem that receives a request for access to the cloud resources, receives user authentication information and compares the user authentication information to a profile. The system also includes a subsystem that instructs a software defined network controller to insert layer 3 and layer 4 user-specific flows to a software defined network device that grants the user access to the cloud resources, if the user is authenticated.

A third aspect of the disclosure provides a method for controlling access to cloud resources that includes receiving at a software defined network controller instructions to grant a user access to a cloud resource. The method includes inserting through the software defined network controller layer 3 and layer 4 user-specific flows to a software defined network device connected to the cloud resource providing to the user access to the cloud resources.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF ILLUSTRATIVE EMBODIMENTS

Figure 1:
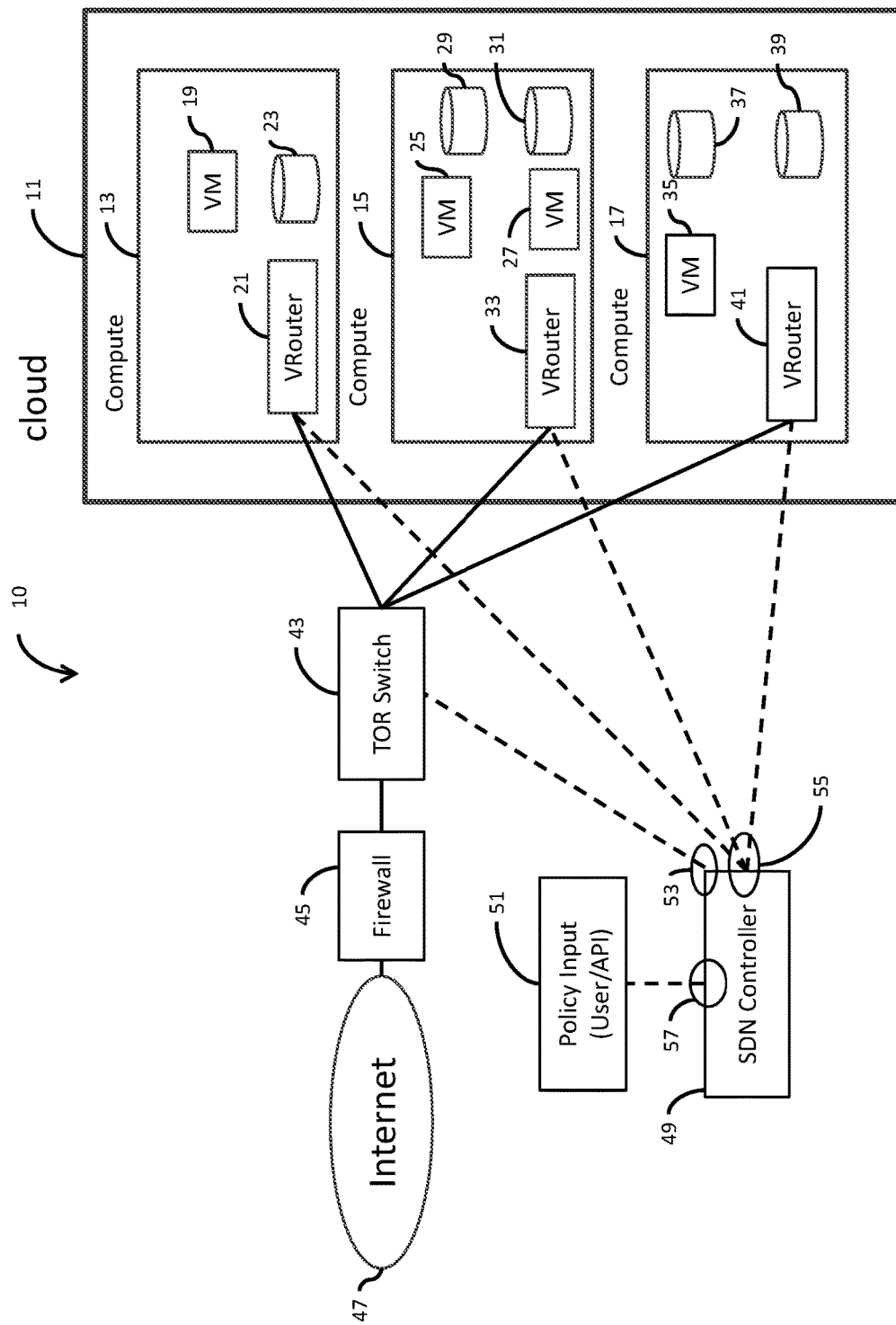
FIG. 1 is a schematic of an embodiment of a high level architecture of a system for providing dynamic remote access control to cloud resources.

Provided herein is a detailed description of this invention. It is to be understood, however, that this invention may be embodied in various forms, and that the suggested (or proposed) embodiments are only possible implementations (or examples for a feasible embodiments, or materializations) of this invention. Therefore, specific details disclosed herein are not to be interpreted as limiting, but rather as a basis and/or principle for the claims, and/or as a representative basis for teaching one skilled in the art to employ this invention in virtually any appropriately detailed system, structure or manner.

To facilitate understanding the present invention, the following glossary of terms is provided. It is to be noted that terms used in the specification but not included in this glossary are considered as defined according to the normal usage of the computer science art, or alternatively according to normal dictionary usage.

AAA Server. An AAA server is a server program that handles user requests for access to computer resources and provides authentication, authorization, and accounting (AAA) services. The AAA server typically interacts with network access and gateway servers and with databases and directories containing user information.

Admin VM. An Admin VM is a virtual machine used by an administrator of a cloud project to perform maintenance functions involving accessing critical resources such as customer information, backup databases and maintenance scripts.

Authentication, Authorization, Accounting (AAA). Authentication, authorization, and accounting (AAA) is a framework for intelligently controlling access to computer resources, enforcing policies, auditing usage, and providing the information necessary to bill for services. Authentication provides a way of identifying a user, typically by having the user enter a valid user name and valid password before access is granted. The process of authentication is based on each user having a unique set of criteria for gaining access. The AAA server compares a user's authentication credentials with credentials stored in a database. If the credentials match, the user is granted access to the network. If the credentials are at variance, authentication fails and network access is denied. Following authentication, a user must gain authorization for doing certain tasks. After logging into a system, for instance, the user may try to issue commands. The authorization process determines whether the user has the authority to issue such commands. Simply put, authorization is the process of enforcing policies: determining what types of activities, resources, or services a user is permitted. Usually, authorization occurs within the context of authentication. Once you have authenticated a user, they may be authorized for different types of access or activity. The final plank in the AAA framework is accounting, which measures the resources a user consumes during access. This can include the amount of system time or the amount of data a user has sent and/or received during a session.

Compute Nodes. A compute node provides the ephemeral storage, networking, memory, and processing resources that can be consumed by virtual machine instances. Within a cloud environment, compute nodes form a core of resources. They supply the processing, memory, network, and storage that virtual machine instances need. When an instance is created, it is matched to a compute node with the available resources. A compute node can host multiple virtual machines until all of its resources are consumed.

Credentials. Credentials are nothing but pieces of information regarding the subject in consideration. They might be account numbers, passwords, certificates etc.

Firewall. A firewall is a network security system that monitors and controls the incoming and outgoing network traffic based on predetermined security rules. A firewall typically establishes a barrier between a trusted, secure internal network and another outside network, such as the Internet, that is assumed not to be secure or trusted.

Flow. A collection of packets that match some set of parameters such as a specific source IP address and a specific TCP port.

Hypervisor. A hypervisor is a hardware virtualization software layer that allows multiple guest operating systems (OS) to run on a single host system at the same time. The guest OS shares the hardware of the host computer, such that each OS appears to have its own processor, memory and other hardware resources. A hypervisor is also known as a virtual machine manager (VMM). The hypervisor installed on the server hardware controls the guest operating system running on the host machine. Its main job is to cater to the needs of the guest operating system and effectively manage it such that the instances of multiple operating systems do not interrupt one another.

IP Pool. An IP Pool is basically a range of IP's for example 192.168.0.100 to 192.168.0.199 would be 100 IP Addresses, This would be considered a "Pool of 100 IP's".

Multi-factor Authentication. Multi-factor authentication is a method of confirming a user's claimed identity by utilizing a combination of two or more different components. These components may be something that the user knows (e.g. a personal identification number, password or pattern), something that the user possesses (e.g. a secure token, phone, or fob) or something that is inseparable from the user (e.g. a biometric like a fingerprint or voice print).

Networking layer. In the seven-layer OSI model of computer networking, the network layer is layer 3. The network layer is responsible for packet forwarding including routing through intermediate routers.

Northbound Interface. A Northbound interface on an SDN controller is the interface to a higher functional layer. The northbound interface is used for communication between the SDN controller and applications that are higher layer control programs.

Router. A router is a networking device that forwards data packets between computer networks. A data packet is typically forwarded from one router to another through the networks that constitute the internetwork until it reaches its destination node.

Software Defined Network. (SDN). Software-defined networking (SDN) is an approach to computer networking that allows network administrators to manage network services through abstraction of the control plane of the network. This is done by decoupling the control plane of the network (i.e. the system that makes decisions about where traffic is sent), from the data plane (i.e. system that forwards traffic to its destination).

SDN Controller. An SDN controller is an application in software-defined networking (SDN) that manages flow control to enable intelligent networking. SDN controllers are based on protocols, such as OpenFlow, that allow the controller to tell switches where to send packets.

Secure Shell. Secure Shell (SSH) is a cryptographic protocol and interface for executing network services, shell services and secure network communication with a remote computer. Secure Shell enables two remotely connected systems to perform network communication and other services on top of an unsecured network.

Southbound Interface. In software defined networking, the southbound interface serves as the interface which allows an SDN controller to communicate with SDN-enabled routers or switches. Its main function is to enable communication between the SDN controller and the network nodes (both physical and virtual switches and routers) so that the router or switch can discover the network topology, define network flows and implement requests related to it via northbound APIs.

Top of Rack (ToR) Switch. A ToR switch is a switch that acts as the gateway between the cloud infrastructure and the external world.

Virtual Machines (VM). A virtual machine (VM) is a software program or operating system that not only exhibits the behavior of a separate computer, but is also capable of performing tasks such as running applications and programs like a separate computer. A virtual machine, usually known as a guest is created within another computing environment referred as a "host." Multiple virtual machines can exist within a single host at one time.

Virtual Router (vRouter). A virtual router is a software-based routing framework that allows the host machine to mimic a typical hardware router. A virtual router can enable a computer/server to have the abilities of a full-fledged router by performing the network and packet routing functionality of the router via a software application.

Virtual Switch (vSwitch). A virtual switch is a software-based switching framework that allows the host machine to mimic a typical hardware switch. A virtual switch can enable a computer/server to have the abilities of a full-fledged switch by performing the network and packet switching functionality of the switch via a software application.

VPN Server. A VPN server is a type of server that enables hosting and delivery of VPN services.

FIG. 1 is a schematic of high-level system architecture for an embodiment of a system 10 for providing software defined network based access control in a cloud. The system includes a plurality of cloud resources 11 which may include compute node 13, compute node 15 and compute node 17. Associated with compute node 13 may be a virtual machine (VM 19) a virtual router (VRouter 21) and a data store 23. Associated with compute node 15 may be virtual machines VM 25, VM 27 and data store 29, data store 31 and VRouter 33. Associated with compute node 17 may be VM 35, data store 37, data store 39 and VRouter 41. Although only three compute nodes are illustrated in this example, it will be understood that any number of compute nodes are contemplated, each having any number of virtual machines and data stores. Compute node 13, compute node 15 and compute node 17 may be in communication with a ToR switch 43. ToR switch 43 may be in communication with the firewall 45 which may in turn be coupled to a network such as the Internet 47. The system 10 also includes a software defined network controller (SDN controller 49) that is coupled to the compute node 13, compute node 15 and compute node 17. Associated with SDN controller 49 are southbound interfaces 53 and 55 and northbound interface 57.

Figure 2:
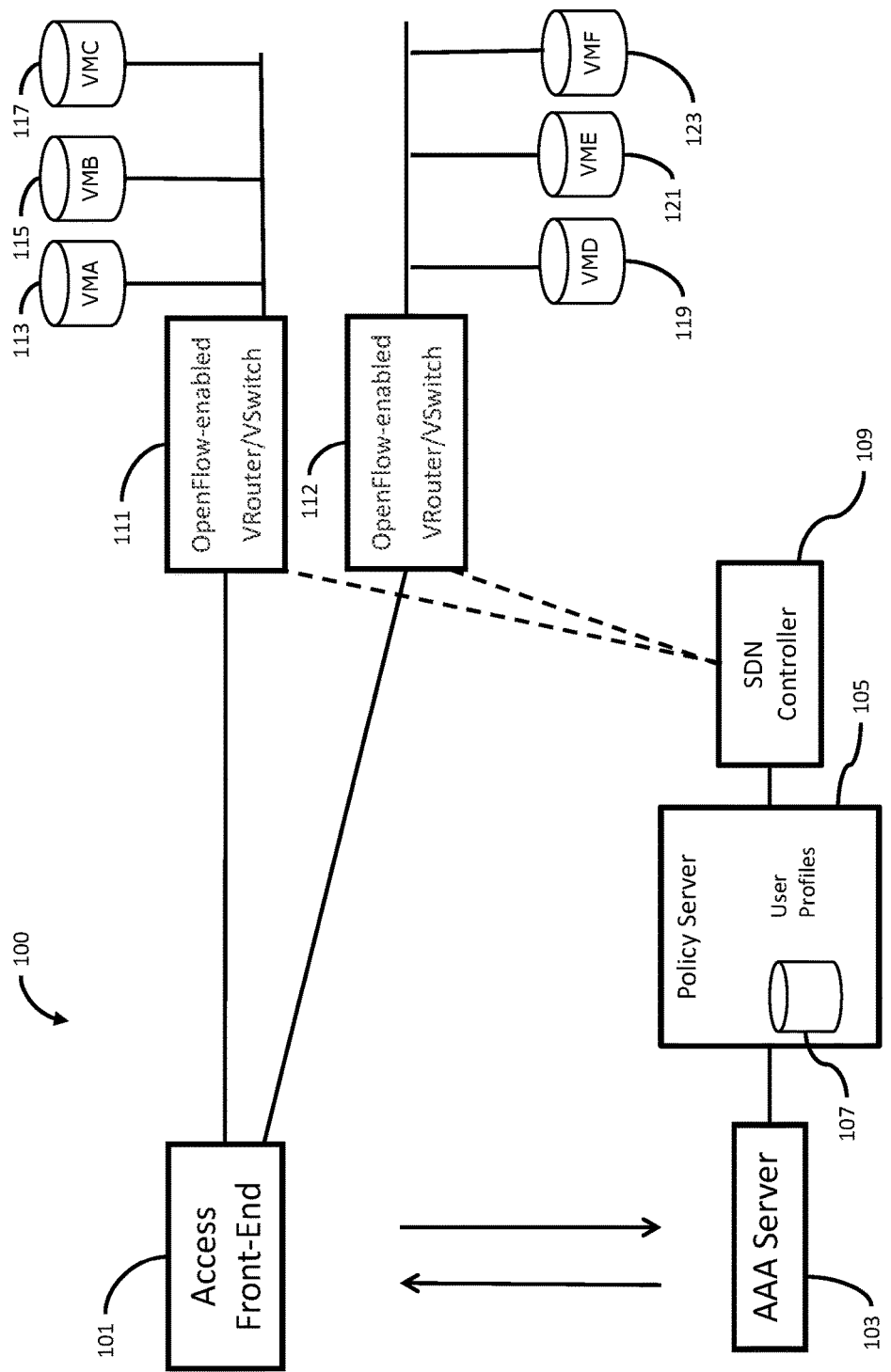
FIG. 2 is a schematic of an embodiment of a system for providing dynamic remote access control to cloud resources.

Illustrated in FIG. 2 is an embodiment of a system for controlling access to network resources 100. The system for controlling access to network resources 100 may include an access front end 101 such as for example a virtual private network server or firewall. The access front end 101 is coupled to an authentication, authorization, and accounting server (AAA server 103). The AAA server 103 may be coupled to a policy server 105 which may be provided with a data store 107. The policy server 105 may be coupled to an SDN controller 109 which may in turn be coupled to a plurality of OpenFlow enabled VRouters/VSwitches such as VRouter/VSwitch 111 and VRouter/VSwitch 112. VRouter/VSwitch 111 may be coupled to, for example, virtual machines, VM 113, VM 115, and VM 117. Similarly, VRouter/VSwitch 112 may be coupled to, for example, virtual machines, VM 119, VM 121, and VM 123. By default network connectivity among VM 113, VM 115 and VM 117 on the one hand, and VM 119, VM 121, and VM 123 on the other hand and other cloud resources are enabled only when such connectivity needs to be always enabled. Thus, for example by default the VRouter/VSwitch that is connected to the critical resources will block all direct access by users. When a user successfully authenticates, using multi-factor authentication, the connectivity that is needed for the user is enabled based on a user profile using SDN flow injection. In one embodiment, the foregoing may be implemented on only the ToR switch 43 (shown in FIG. 1). In another embodiment the foregoing may be implemented only on the VRouter/VSwitch 111 and VRouter/VSwitch 112. In yet another embodiment the foregoing may be implemented on both ToR switch 43 and the VRouter/VSwitch 111 and VRouter/VSwitch 112. The user is authenticated by the AAA server 103. When a user is authenticated, a profile stored in the policy server 105 is used to control the insertion of user-specific flows by the SDN controller 109 that grant the user network access to critical resources. Depending on the user profile, a source IP address is assigned to the user from a pre-configured IP address pool. Then, flow rules will enable/disable access to VMs, databases, etc. by adding flow rules with this (layer 3) IP address and destination IP addresses of VMs, databases, etc. to which the user has access. Also, the flow rules will restrict access to only those layer 4 protocols/ports that are allowed. The different access criteria can be broken up into different types: roles, (assign rights to a type of user who performs a certain task. The role is based on a job assignment or function); groups, (assign rights to groups of users that require the same type of access to information and resources); location, (assign rights based on physical or logical location); time, (assign rights based on Time of day, or temporal isolation); or transaction types. When the user-session is terminated or an idle time-out value is reached the user-specific flows are removed from the VRouter/VSwitch. User session termination can be detected at the AAA server using the accounting function of AAA.

Figure 3:
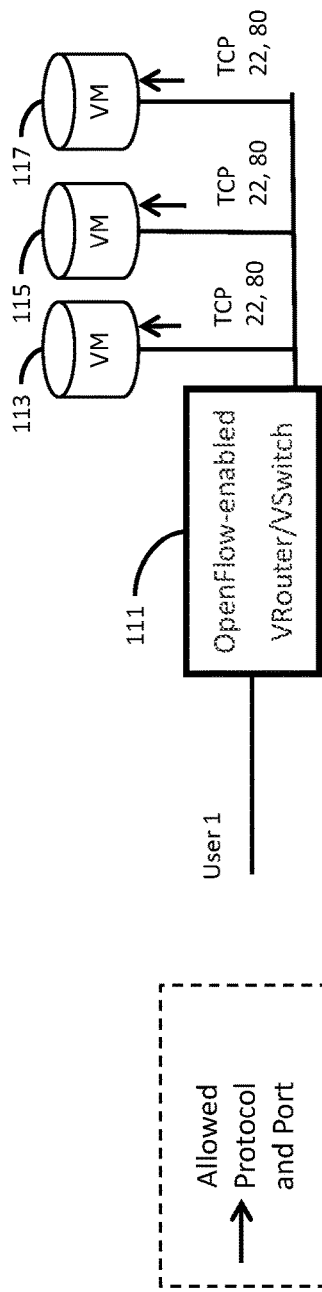
FIG. 3 is a schematic illustrating access to virtual machines at a compute node by a user.

Illustrated in FIG. 3 is a layer 3 and layer 4 flow rules for a User 1. In this example, the flow rules provide User 1 with access to VM 113, VM 115 and VM 117 on tcp port 22 (SSH protocol) and port 80 (http protocol).

Figure 4:
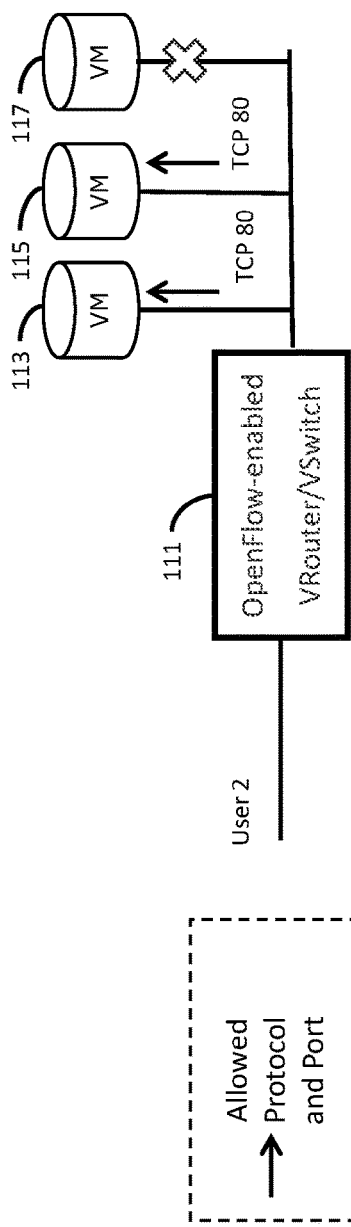
FIG. 4 is a schematic illustrating access to virtual machines at a compute node by another user.

Illustrated in FIG. 4 is a layer 3 and layer 4 flow rules for a User 2. In this example, the flow rules provide User 2 with access to VM 113, and VM 115 tcp port 80 (http protocol) but does not provide access to VMC (VM 117).

Figure 5:
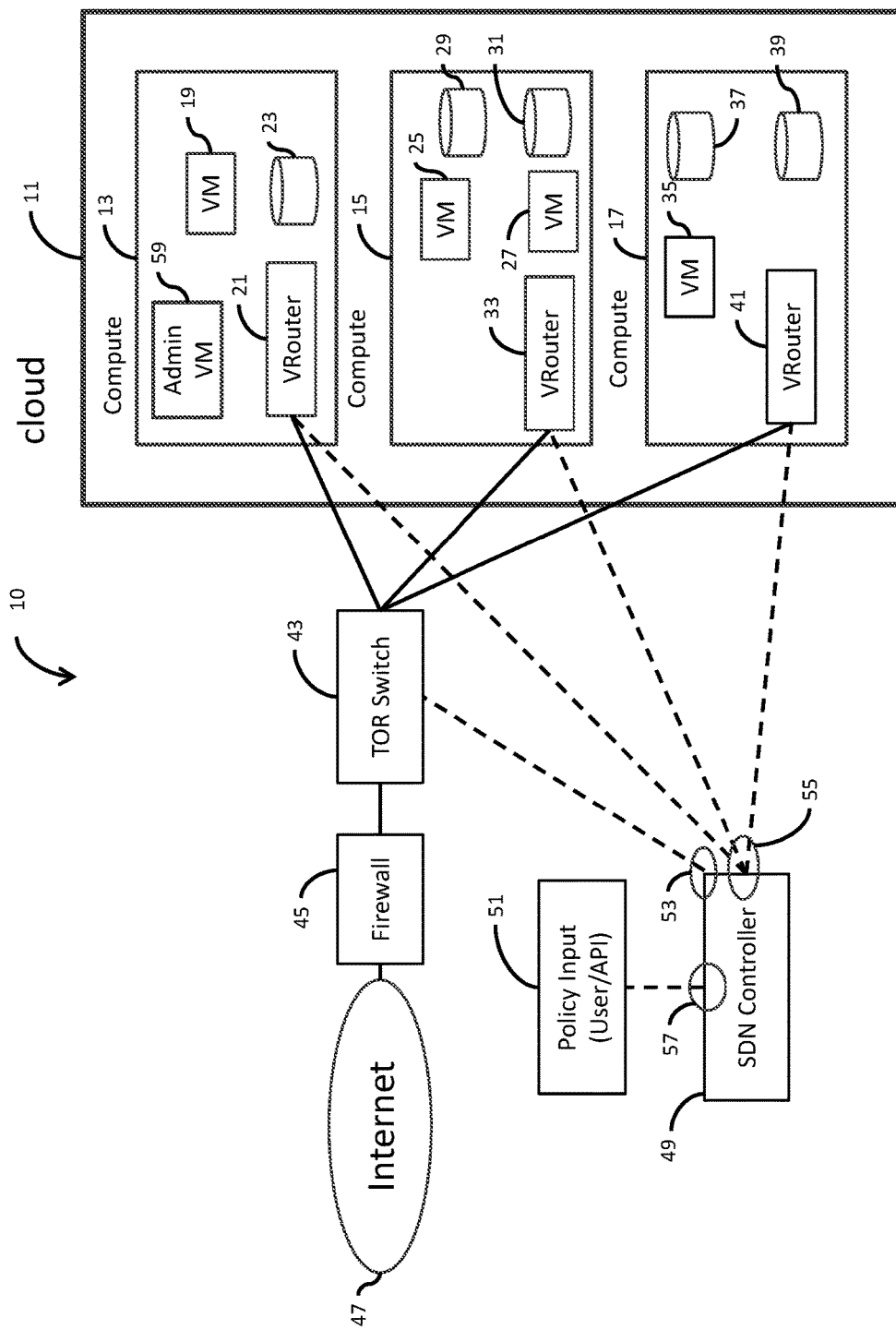
FIG. 5 is a schematic of another embodiment of a high level architecture of a system for providing dynamic remote access control to cloud resources.

Illustrated in FIG. 5 is an alternate embodiment of the system 10 having an administration virtual machine (admin VM 59) in at least one of the compute nodes, in this case the compute node 13. In this case, when a user is not accessing the admin VM 59 its connectivity to critical resources could be blocked by SDN rules or any traffic from the admin VM 59 to critical resources can be rerouted to an intrusion detection system using alternate SDN rules.

Figure 6:
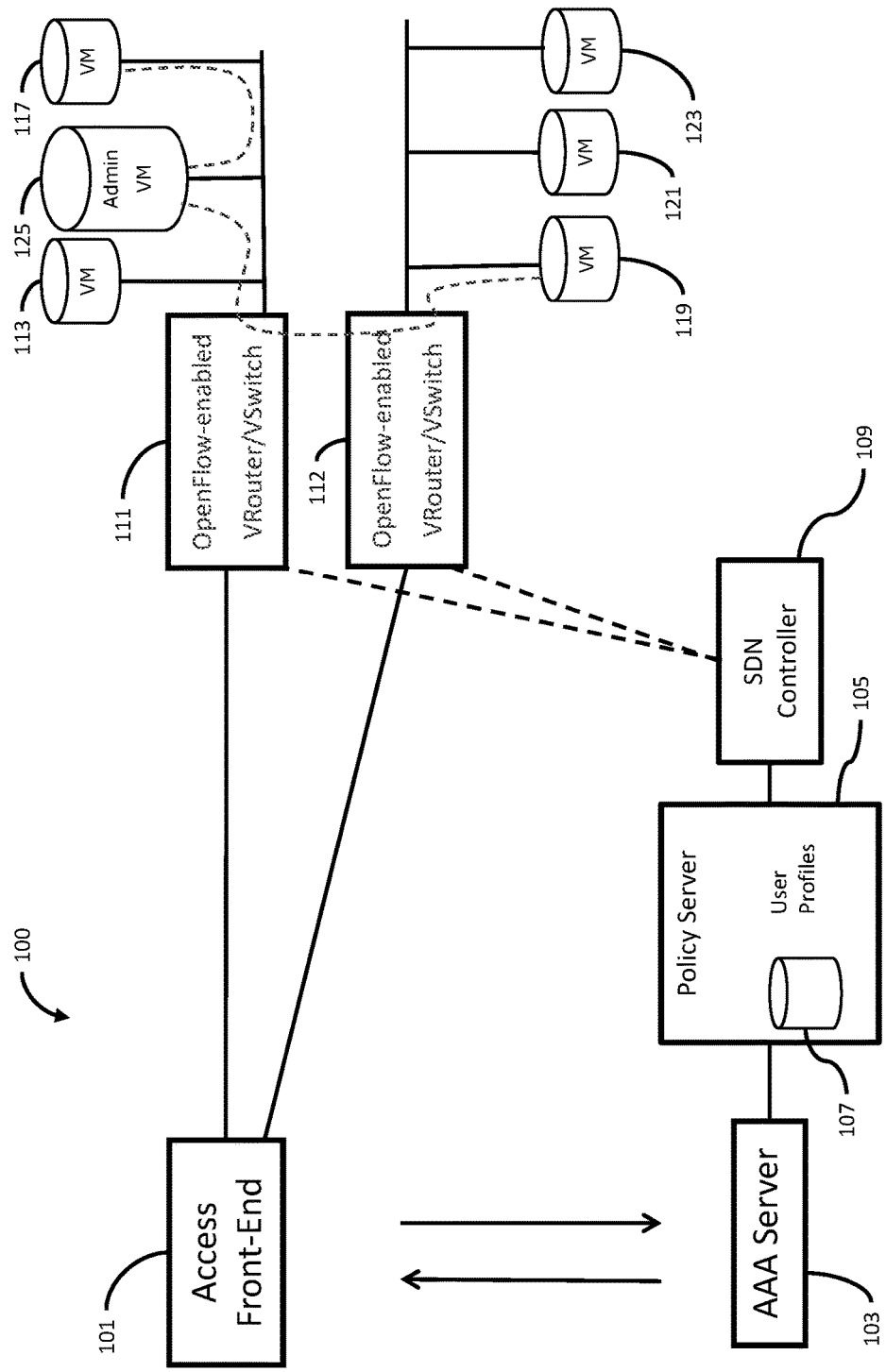
FIG. 6 is a schematic of another embodiment of a system for providing dynamic remote access control to cloud resources.

FIG. 6 illustrates the results of operation of the system or controlling access to network resources 100 to be implemented in the architecture illustrated in FIG. 5.

Figure 7:
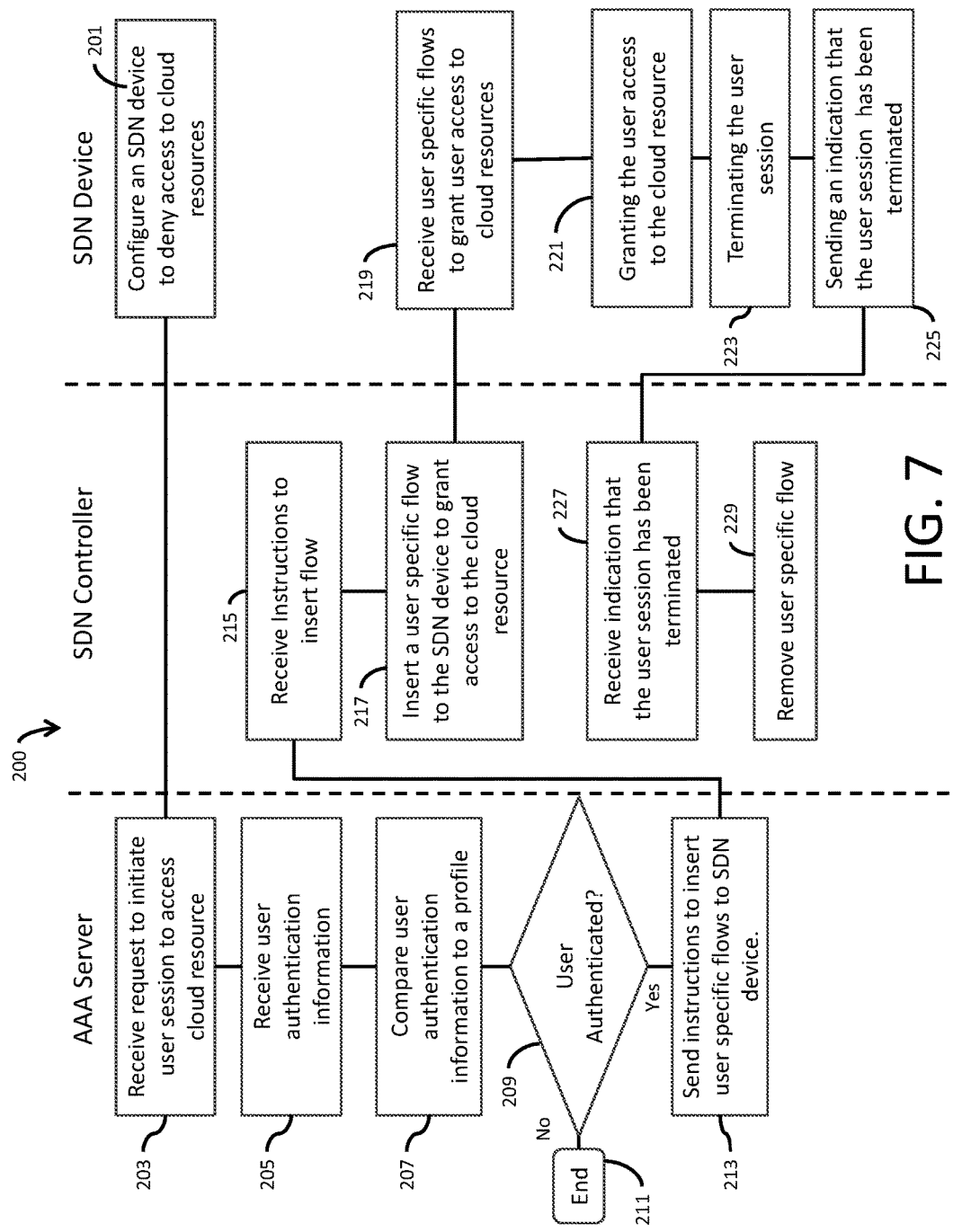
FIG. 7 is a flow diagram illustrating an embodiment of a method for providing dynamic remote access control to cloud resources.

FIG. 7 is a flowchart of a method for controlling access to network resources 200 that may be implemented by the systems discussed above. For purposes of simplicity of explanation, one or more methodologies shown in the form of a flowchart may be described as a series of steps. It is to be understood and appreciated that the subject disclosure is not limited by the order of the steps, as some steps may occur in accordance with the present disclosure or in a different order and/or concurrency with other steps shown and described here. For example, those skilled in the art may understand and appreciate the methodology which may be represented as a series of interrelated states or events, such as in a state diagram. Moreover, not all illustrated acts may be required to implement a methodology in accordance with the present disclosure.

In step 201 the method configures an SDN device (such as for example VRouter/VSwitch 111 or VRouter/VSwitch 112 in FIG. 2), to deny all access to cloud resources.

In step 203 a request to initiate a user session to access cloud resources is received by the AAA server 103.

In step 205 the AAA server 103 receives user authentication information in the form of two factor authentication.

In step 207 the AAA server 103 compares the user authentication information to a user profile.

In step 209 the AAA server 103 determines whether the user is authenticated.

If the user is not authenticated and access is denied in step 211. If the user is authenticated, the AAA server 103 sends instructions to insert user-specific flows to the SDN device to grant user access to the cloud resource.

In step 215 the SDN controller 109 receives instructions to insert a flow to the SDN device.

In step 217 the SDN controller 109 insert a user-specific flow to the SDN device to enable the SDN device to grant access to the cloud resource.

In step 219 the SDN device receives user-specific flows to grant user access to cloud resources.

In step 221 the SDN device grants the user access to the cloud resource.

In step 223 the user session is terminated.

In step 225 the SDN device sends an indication that the user session has been terminated to the SDN controller 109.

In step 227 the SDN controller 109 receives an indication that the user session has been terminated.

In step 229 the SDN controller 109 removes the user-specific flow thereby denying the user access to the cloud resources.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed:

1. A method comprising:
   receiving in an authentication, authorization, and accounting server a request from a user to access a cloud resource;
   receiving user authentication information in the authentication, authorization, and accounting server;
   comparing the user authentication information to a profile stored in a policy server to determine if the user is authorized to access the cloud resource;
   when the user is authorized to access the cloud resource, initiating a user session using a software defined network flow injection;
   assigning a source layer 3 IP address to the user from a preconfigured IP address pool;
   assigning an allowed layer 4 protocol or port;
   inserting a user specific flow with an IP address flow rule with the source layer 3 IP address and destination IP address of the cloud resource and a layer 4 flow rule that restricts access to only the allowed layer 4 protocol or port;
   granting the user access to the cloud resource;
   when the user session is terminated, sending an indication to the software defined network controller that the user session has been terminated; and
   removing the user specific flow with the software defined network controller to deny the user further access to the cloud resource.

2. The method of claim 1 wherein the software defined network device comprises a virtual router.

3. The method of claim 1 wherein the request from the user is provided by a front end access device.

4. The method of claim 2 wherein the virtual router is SDN enabled.

5. The method of claim 1 wherein the software defined network device is configured to deny access to the cloud resource unless there is a user-specific flow granting access to the user.

6. The method of claim 1 wherein the software defined network device is a ToR switch.

7. A system for controlling access to a cloud resource comprising:
   an authentication, authorization, and accounting server disposed in a software defined network;
   at least one subsystem that:

receives a request in an authentication, authorization, and accounting server for access to the cloud resources from a user;

receives user authentication information in the authentication, authorization, and accounting server;

compares the user authentication information to a profile stored in a policy server to determine if the user is authorized to access the cloud resource;

when the user is is authorized to access the cloud resource, initiates a user session using a software defined network flow injection;

assigns a source layer 3 IP address to the user from a preconfigured IP address pool;

assigns an allowed layer 4 protocol or port;

inserts a user specific flow with an IP address flow rule with the source layer 3 IP address and destination IP address of the cloud resource and a layer 4 flow rule that restricts access to only the allowed layer 4 protocol or port;

grants the user access to the cloud resource;

when the user session is terminated, sends an indication to the software defined network controller that the user session has been terminated; and removes the user specific flow with the software defined network controller to deny the user further access to the cloud resource.

8. The system of claim 7 wherein the software defined network device comprises a virtual router.

9. The system of claim 7 wherein the at least one subsystem that receives a request for access comprises a subsystem that receives a request for access form a front end access device.

10. The system of claim 8 wherein the virtual router is SDN enabled.

11. The system of claim 7 wherein the software defined network device is configured to deny access to the cloud resources unless there is a user-specific flow granting access to the user.

12. The system of claim 7 wherein the software defined network device is a ToR switch.

* * * * *